(No Model.)
L. DURAND.
DOUGH KNEADING MACHINE.
No. 485,096. Patented Oct. 25, 1892.
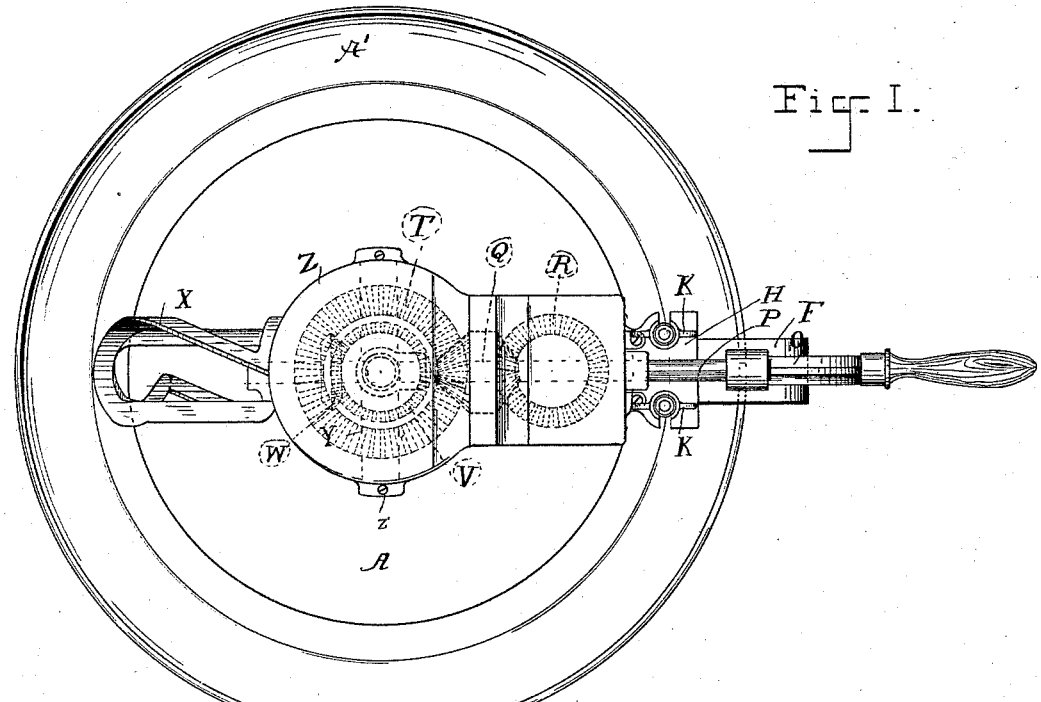
Fig. I.
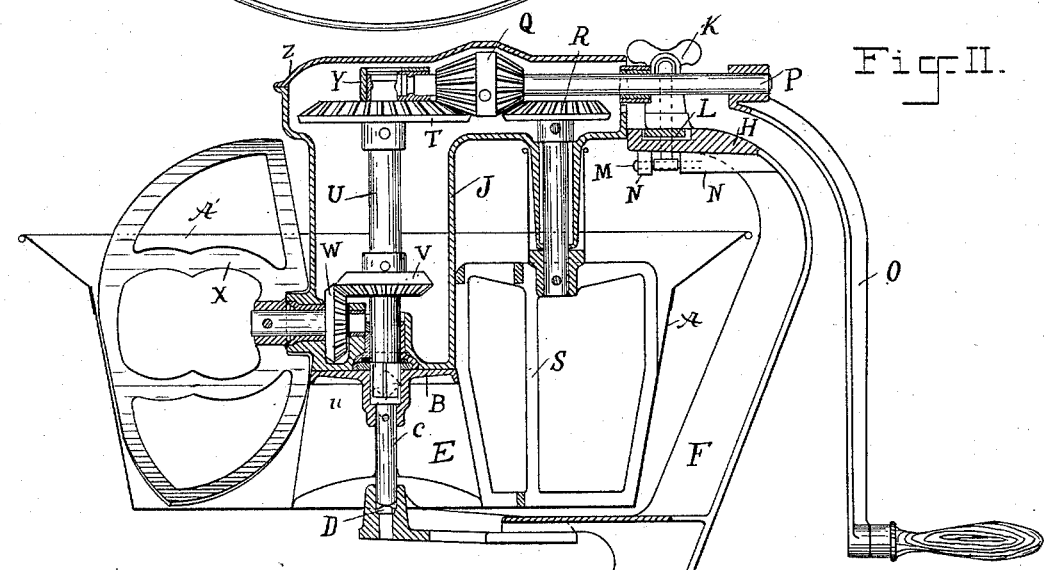
Fig. II.
Witnesses
Lillie Hanna
C. W. Thomas
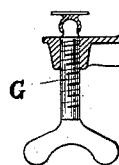
Inventor
Louis Durand
per
Knight Bros
attys

UNITED STATES PATENT OFFICE.

LOUIS DURAND, OF NEW YORK, N. Y.

DOUGH-KNEADING MACHINE.

SPECIFICATION forming part of Letters Patent No. 485,096, dated October 25, 1892.

Application filed March 11, 1892. Serial No. 424,566. (No model.)

*To all whom it may concern:*

Be it known that I, LOUIS DURAND, a citizen of the United States, residing at New York, in the county and State of New York, have invented certain new and useful Improvements in Dough-Kneading Machines, of which the following is a specification.

My invention relates generally to a class of dough-kneaders which are provided with stirrers and kneaders rotating on separate axes; and in the present instance consists of certain improvements which are particularly applicable to small-sized machines for family use.

The novel features of my invention will be referred to in the specification and particularly pointed out in the claims.

Referring to the accompanying drawings, which form a part of this specification, Figure I represents a plan view of the machine. Fig. II represents a central vertical section, some of the working parts being shown in elevation.

In the drawings, A represents a removable kneading-pan, which consists of an annular receptacle and is provided with a flaring rim A'. Arranged concentrically in relation to the pan is a bridge B, which is attached to the pan at its inner circumference, and it is provided with a spindle C, which supports the pan and which is adapted to turn on a supporting-point D.

F is a frame adaptable by means of thumb-screw G to be attached to a table or other convenient place, and is provided with an inwardly-extending arm H, which serves as a support or bearing for the removable frame J, as will be described. This frame J is a box or casing adapted to hold and retain all the moving parts of the machine and is attachable to the main frame F H by means of thumb-screws K, which serve when in position to lock the extension L of the frame J and retain the parts in place. The thumb-screws K are swiveled by means of pin M in the lugs in N, and when they are released by being unscrewed and thrown backward—one on each side—the frame, with all the moving parts contained within it, can be lifted out, thus exposing the pan and its contents.

At O, I show a handle attached to shaft P, having a double or two-sided bevel-gear Q, which meshes the one side with the bevel-gear R on the shaft of the stirrer S and upon the other side with the bevel T of the main shaft U. The main shaft U is provided with a bevel-gear V, which meshes with bevel-gear W of the kneader X.

At Y, I show a support having a centrally-located opening through which the shaft U enters from below and a similar opening at the side through which the shaft P enters at the side. This support rests upon and is attached to the sides of the frame J, as shown in Fig. I, and serves to steady and retain in a central position all the working parts converging therefrom.

At Z, I show a cover which incloses the top of the casing J and serves to seal the same. The screws Z' are utilized to attach the cover to the casing and bind the supporting-piece Y between them.

The main shaft U is provided at its lower end with a square head *u*, which fits into a corresponding orifice in the bridge-piece B. These two parts serve to interlock the shaft with the pan and cause when the main shaft U is rotated a corresponding revolving movement of the pan.

By having all the moving parts inclosed within a single casing easily removable I provide a convenience of construction not heretofore attained.

I claim as new and of my invention—

1. The dough-kneading machine having frame F H and casing J, removable therefrom, the pan A, having the bridge B, and the main shaft U, arranged to interlock with the pan at *u*, as and for the purpose set forth.

2. In a dough-kneading machine, the combination of the casing J, having a cover Z, supporting-piece Y, and shafts P and U, as and for the purpose set forth.

3. The combination of the removable casing J, the frame F H, to which the said casing is arranged to be attached, and the thumb-screws K for securing the casing to the frame, as and for the purposes set forth.

LOUIS DURAND.

Witnesses:
M. V. BIDGOOD,
EDWARD BRANDT.